June 18, 1957
W. WADE
2,795,823
PROCESS OF RECOVERING WASTE COATED
FIBERS AND PRODUCTS MADE THEREWITH
Filed June 2, 1952
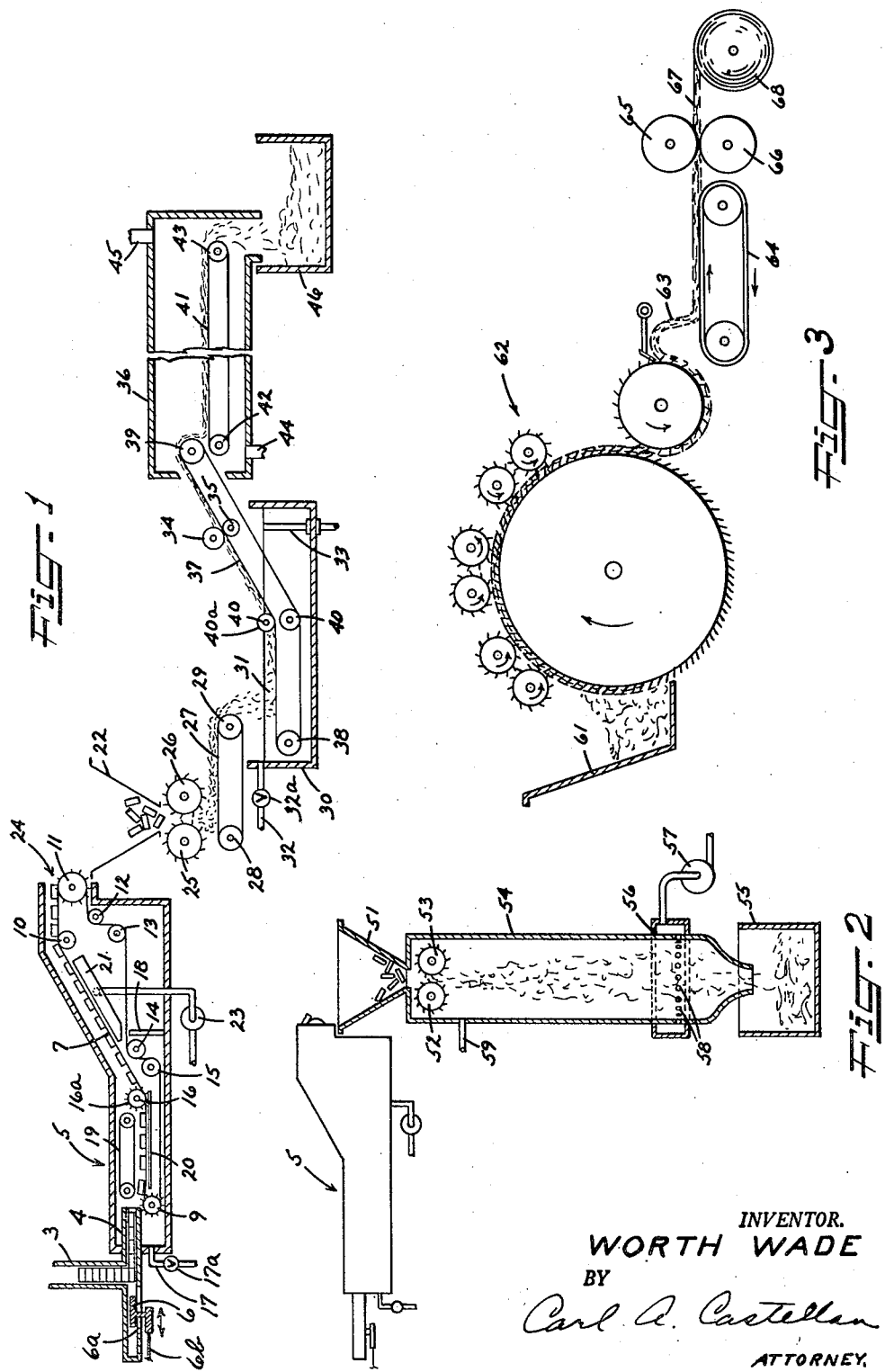
INVENTOR.
WORTH WADE
BY
Carl A. Castellan
ATTORNEY.

United States Patent Office 2,795,823
Patented June 18, 1957

2,795,823

PROCESS OF RECOVERING WASTE COATED FIBERS AND PRODUCTS MADE THEREWITH

Worth Wade, Rosemont, Pa., assignor to American Viscose Corporation, Philadelphia, Pa., a corporation of Delaware Application June 2, 1952, Serial No. 291,165

5 Claims. (Cl. 19—66)

The present invention relates to novel and improved methods of manufacturing textile products and to the apparatus associated therewith. More particularly the present invention relates to novel and improved methods and apparatus for producing textile products wherein the component fibers thereof are bonded one to another by a potentially adhesive substance.

In the manufacture of textile materials from the various well-known potentially adhesive fiber-forming substances, it is ordinarily necessary to filter the substances or a solution or dispersion thereof through one or more batts of fibrous material prior to their extrusion from the spinneret or other conventional fiber-forming device. During the filtering process the individual fibers of the filter batt become coated and the batt becomes impregnated more and more non-uniformly with the fiber-forming dope in the form of a viscous gel particularly on one side until the substantially clogged batt unduly impedes normal flow of the fiber-forming dope therethrough and must be replaced. In the past these thoroughly impregnated batts have ordinarily been considered waste and have therefore been discarded.

It is the principal object of the present invention to make use of the heretofore wasted expended fibrous filter batts in a novel and improved textile process wherein bonded-type fibers, papers, yarns, felts and other similar products are readily prepared.

Other objects and advantages of the present invention will be apparent from the following description. In the drawing which is illustrative of the invention, Figure 1 is an elevational view in section of one embodiment of the present invention wherein potentially adhesive fibers are prepared from the heretofore discarded filter batts;

Figure 2 is an elevational view in section of a modification of the apparatus shown in Figure 1; and Figure 3 is a diagrammatic view of typical apparatus which may be employed in the present invention to process the potentially adhesive fibers into a bonded type of fibrous product such as a paper, felt, yarn or the like.

In the textile art, potentially adhesive fibers or an admixture thereof with a suitable non-adhesive filler material are found particularly useful in the manufacture of the various types of bonded products. Thus, for example, when cellulose acetate fibers or the like are thoroughly commingled with a suitable non-adhesive fibrous filler material and are thereafter momentarily activated with heat or a suitable solvent into a tacky or adhesive condition, the various component fibers of the ultimate product become fused or bonded one to another upon proper deactivation thereof.

The waste filter batts from the filtration of cellulose acetate dope above described are useless as textile fibers because the fibers in the dried batts cannot be separated one from another. Moreover, the cellulose acetate dope does not impregnate and saturate the filter batts uniformly; on the contrary, the acetate dope is found to be deposited to a much greater extent on one side, i. e. the front side, than on the back side and the deposit of dope is also substantially only in the central areas of the filter batt, while the marginal areas are wholly uncoated. Now it is a primary object of the present invention to distribute the cellulose acetate dope found on the filter batts so as to coat all the fibers in the batt in a substantially uniform manner, to separate the coated fibers one from another and to render the coated fibers thus recovered useful in the textile, felts, and paper arts.

In general the improved textile process of the present invention for the preparation of potentially adhesive fibers from fibrous batts which have been saturated with a potentially adhesive material comprises the treatment of the saturated batts with a solvent of the potentially adhesive material, distribution of the dissolved material over the uncoated fibers and the separation of the coated fibers of the batts one from another. In this way, the heretofore wasted expended fiber batts are put to good use in the manufacture of potentially adhesive materials and the various bonded products prepared therefrom.

A preferred embodiment of the apparatus which is employed in accordance with the present invention to separate and suitably process the component fibers of the impregnated filter batts is shown in Figure 1 of the drawing. As illustrated therein, the expended filter batts which preferably contain 10–80% by weight of a potentially adhesive material are deposited in the magazine 3 in any suitable manner and are thereafter periodically ejected from the open end of the tubular member or duct 4 into the container or vat 5. The batt ejecting means preferably comprises the plunger 6 which reciprocates in the duct 4 such that, with each forward movement, the batt positioned at the bottom of the magazine is contacted and urged a predetermined additional amount nearer the open end of the duct. As shown in the drawing, a portion of the plunger 6 preferably extends through a slot 6a in the duct 4 so that a reciprocatory motion may be readily imparted to the plunger in any conventional manner through the linkage 6b.

The batts as they are discharged from the duct 4 are deposited on the endless perforated conveyor 7 which is suitably positioned in the container 5 by the various pulley members or rollers 9, 10, 11, 12, 13, 14, and 15. The shaft 16 with its associated sprocket members 16a which preferably engage perforations or the like along each side edge of the conveyor also aids in positioning and guiding the conveyor in the container 5 without contacting or interfering with the movement of the batts.

As the batts travel on the conveyor 7 between the pulley member 9 and the sprocket members 16a, they are immersed in a suitable solvent for the potentially adhesive material with which the batts have been thoroughly impregnated. In this way the edges and other relatively uncoated and unimpregnated areas of the batts are treated with substantial amounts of the potentially adhesive material which become dissolved in the solvent bath.

Controlled amounts of solvent are delivered to the container 5 by the pipe or line 17 and its associated valve 17a and are preferably confined to a restricted portion thereof by a partition member 18. Controlled amounts of the potentially adhesive material may also be delivered to the container 5 through the line 17 or in any other suitable manner to supplement that which is dissolved from the saturated filter batts and thereby increase the concentration of the bath for more effective and more uniform treatment of the relatively uncoated areas of the batt. Thus, as will be more apparent hereinafter, the solution in the container 5 spreads over and coats all of the fibers substantially uniformly.

The endless belt or the like 19, which is also preferably perforated, and the elongated plate member 20 are positioned preferably as shown respectively above and below the conveyor 7 and cooperate therewith to facilitate and expedite movement of the batts through the bath. Thus by passing the batts on the conveyor between the plate 20 and the belt 19 as shown, their movement with the conveyor 7 through the bath is insured even though their relative specific gravity might be less than that of the solvent such that they would normally be buoyed upwardly from the moving conveyor.

As the batts proceed upwardly from the bath and move past the suction box 21, excess solvent is removed from each of the batts prior to their delivery to the hopper 22. The suction box 21 which preferably comprises an extended perforated surface over which the upwardly moving parts pass and which is connected as shown to any conventional source of evacuation such as the pump or the like 23, also effectively reduces diffusion of the ordinarily highly volatile solvent into the outside atmosphere through the opening 24 and through the batt delivery tube or duct 4.

The relatively uniformly coated batts which have been deposited in the hopper 22 are then fed to any suitable opening device such as between the teaser rolls 25 and 26 which are positioned below the lower extremity of the hopper. By suitably driving either of the teaser rolls or if desired both of them at different rates in any convenient manner the component fibers of each of the batts are separated and disentangled one from another to form individual coated fibers. The coated fibers are then deposited upon the horizontally disposed conveyor belt or the like 27 which extends between the pulley members 28 and 29.

From the belt 27 the fibers are deposited in the container 30 wherein a washing operation coagulates and renders non-tacky the potentially adhesive coating on each fiber. Thus a controlled quantity of any suitable washing solution 31 is delivered through the inlet pipe or line 32 and its associated valve 32a. The conventional overflow pipe 33 preferably extends upwardly through the bottom of the container 30 and maintains the desired liquid level therein.

The fibers are carried through the bath 31 and upwardly between the squeeze rolls 34 and 35 into the drying chamber 36 by the endless conveyor belt 37 which is guided by the pulley members or the like 38, 39, and 40 and the spaced sprocket members 40a on the shaft 40b. The spaced sprocket members are preferably adapted to engage merely the perforated side edge portions of the belt 37 so as to properly guide the same without unduly contacting or intefering with the fibrous materials positioned thereon.

In the drying chamber the fibers are transferred from the belt 37 to the horizontally disposed conveyor 41 which extends between the pulley members or the like 42 and 43. Any suitable drying gas such as air or the like is delivered to the chamber 36 through the inlet conduit or pipe 44 and circulates upwardly and about the fibers on the conveyor 41. Thereafter the drying gases pass from the chamber 36 through the outlet pipe or line 45 preferably, though not shown on the drawing, to any suitable conventional recovery apparatus. The receptacle 46 which is positioned as shown adjacent the discharge extremity of the drying chamber, collects the properly dried fibers as they are discharged from the end of the belt 41.

A modified embodiment of the above-described apparatus, which is particularly applicable in the present invention when highly volatile solvents of the potentially adhesive coating material are used, is disclosed in Figure 2 of the drawing. As illustrated therein, the batts after being treated by the volatile solvent in the soaking chamber which is generally designated by the reference character 5 are deposited in the hopper 51. One or both of the teaser rolls 52 and 53 which are positioned adjacent the lower extremity of the hopper 22 is driven in any convenient manner so as to separate and disentangle one from another the component fibers of each of the batts as they pass therebetween. The cylindrical casing 54 in which the separated fibers thereafter gravitate downwardly is preferably secured to the hopper in any conventional manner and extends downwardly therefrom toward the fiber collecting receptacle 55. The manifold 56 which is preferably positioned as shown about a lower portion of the casing 44 receives any suitable drying gas such as heated air or the like from the compressor device 57 and conducts the same through the apertures 58 in the casing. The outlet pipe or line 59 which communicates with the interior of the casing preferably adjacent an upper portion thereof is adapted to collect the upwardly moving drying gases in the casing and preferably, though not shown on the drawing, return the same through any conventional solvent recovery apparatus to the compressor device 57. Thus it is seen that as the fibers move downwardly in the casing toward the receptacle 55, wherein they are finally collected, the drying gases readily remove the highly volatile solvents from the potentially adhesive material which coats each of the fibers so as to provide set or hardened coatings of the potentially adhesive material thereon.

It is to be understood that the novel and improved methods and apparatus of the present invention described heretofore and hereinafter find ready application wherever it is necessary or expedient to filter any of the numerous well-known potentially adhesive materials. Thus, the expended filter batts which have been thoroughly saturated with any potentially adhesive ester of cellulose such as cellulose nitrate, cellulose acetate and cellulose mixed esters or any synthetic resin such as vinyl chloride and vinyl acetate, a copolymer of vinyl chloride and vinyl acetate, acrylonitrile, vinylidene chloride, a copolymer of acrylonitrile and vinylidene chloride, a copolymer of acrylonitrile with a vinyl pyridine or vinyl acetate, or the like may be readily processed in accordance with the present invention to manufacture the various types of well-known bonded products.

The nature of the solvents or solutions which are supplied to the various baths in the above-described apparatus is naturally wholly dependent upon the particular type of potentially adhesive material with which the fibers are coated. Thus any suitable well-known solvent of the potentially adhesive material may be used to redistribute the coatings on the fibers in the bath in the container 5 and any suitable well-known chemical substance in which the potentially adhesive material is insoluble and in which the solvent is soluble may be thereafter used to coagulate and harden the fiber coatings.

The potentially adhesive fibers, which have been prepared from the expended fibrous batts as have been described above and which, if need be, have been opened in any convenient manner, are now ready to be formed into a bonded product, either alone or in combination, in any suitable proportion, with a non-adhesive fibrous or non-fibrous filler material such as cotton, rayon, wool or the like and processed by apparatus such as that shown in Figure 3 of the drawing into the desired final bonded form. As illustrated therein, the commingled adhesive and non-adhesive fibers are deposited in a hopper 61 and are delivered therefrom to the various conventional worker and stripper rolls of the garnett, picker, or carding apparatus which is generally designated by the reference numeral 62. The fibrous web 63 is then doffed from the carding apparatus and is deposited on any suitable conveyor means such as the endless belt 64. Thereafter it passes between the suitably heated rolls 65 and 66 whereby the potentially adhesive cotton fibers of the web are activated into a tacky and adhesive condition so that upon deactivation by cooling or the like the desired bonded product or fabric is produced. The finished bonded web or fabric 67 is then preferably collected on any suitable take-up means such as the drum 68 shown on the drawing.

It is to be understood that, although a preferred means for activating the fibrous web 63 has been shown and described, other conventional means for activation thereof could be used without departing from the spirit or scope of the present invention. Thus, for example, the web could be treated with heated supplies of air or the like where it is desired to activate the same without undue compaction.

It is to be also understood that the above described bonded product 67 which is preferably manufactured by the conventional web-forming apparatus shown in Figure 3 of the drawing is illustrative only of the numerous types of bonded products into which the potentially adhesive fibers might be prepared in accordance with the present invention. Thus, for example, the said potentially adhesive fibers might be used in the manufacture of bonded products wherein only selected areas of the web are activated by an embossing roll or the like such that quilt-like or other similar patterns may be obtained or wherein one or more layers of a potentially adhesive fibrous material are activated in a laminated product. Similarly many other well-known types of bonded products and the like may be manufactured from the said potentially adhesive fibrous materials by any suitable procedure which is conventional in the art.

The following examples are provided to illustrate more specifically the manner in which various types of bonded products have been manufactured from the potentially adhesive materials of the present invention.

*Example I*

Waste cotton filter batts which had been non-uniformly coated with approximately 25% by weight of cellulose acetate were deposited in the vat 5 where the coating was distributed substantially uniformly over the cotton fibers. Following the teasing, coagulating, and drying operations, the uniformly coated fibers were then delivered to a carding machine where a suitable non-woven textile web was formed. The web was then passed between a pair of nip rolls at a temperature of 350° F. whereby the non-adhesive cotton fibers were fused one to the other by the thermoplastic cellulose acetate.

*Example II*

Waste cotton filter batts which had been non-uniformly coated with approximately 20% by weight of cellulose acetate were deposited in the vat 5 where the acetate was distributed substantially uniformly over the cotton fibers and where, by introducing an additional amount of acetate, its percent by weight was increased to 25%. Following the teasing, coagulating, and drying operations, the uniformly coated potentially adhesive cotton fibers were mixed with an equal quantity by weight of waste regenerated cellulose fibers and delivered to a carding machine. The carded web was then passed between a pair of heated rollers at 350° F. as in example I to form a useful felted product.

*Example III*

As in the above described Example I, the cellulose acetate coated cotton fibers were prepared in accordance with the present invention and then delivered to a conventional flock cutter where the various fibers were cut to a maximum length of ⅛". The shortened fibers were then placed in aqueous suspension and condensed upon a suitable web or screen to form a potentially adhesive fibrous mat. The mat was then activated as in the above described examples to form a material which was made into containers or bags in which tea, coffee, or the like could be placed.

While preferred embodiments of the invention have been disclosed, the description is intended to be illustrative only and it is to be understood that changes and variations may be made without departing from the spirit and scope of the invention as defined by the appended claims.

I claim:

1. A method of preparing potentially adhesive fibers from waste filter batts which after their use in filtering a potentially adhesive material carry a non-uniform deposit of said material thereon comprising treating the batts with a solvent of the potentially adhesive material to distribute said material throughout each of the batts; and separating one from another the component fibers of each of the batts before removal of the solvent from the batts.

2. A method of preparing potentially adhesive fibers from waste filter batts which after their use in filtering a potentially adhesive material carry a non-uniform deposit of said material thereon comprising treating the batts with a solvent of the potentially adhesive material to distribute said material throughout each of the batts; removing excess solvent from the batts; and separating one from another the component fibers of each of the batts before removal of the solvent from the batts.

3. A method of preparing potentially adhesive fibers from waste filter batts which after their use in filtering a potentially adhesive material carry a non-uniform deposit of said material thereon comprising treating the batts with a solvent of the potentially adhesive material to distribute said material throughout each of the batts; removing excess solvent from the batts; separating one from another the component fibers of each of the batts before removal of the solvent from the batts; and coagulating the potentially adhesive material associated with each of the separated fibers.

4. A method of preparing potentially adhesive fibers from waste filter batts which after their use in filtering a potentially adhesive material carry a non-uniform deposit of said material thereon comprising treating the batts with a solvent of the potentially adhesive material to distribute said material throughout each of the batts; removing excess solvent from the batts; separating one from another the component fibers of each of the batts before removal of the solvent from the batts; coagulating the potentially adhesive material associated with each of the separated fibers in a liquid bath; and drying the fibers.

5. A method of preparing potentially adhesive fibers from waste filter batts which after their use in filtering a potentially adhesive material carry a non-uniform deposit of said material thereon comprising treating the batts with a highly volatile solvent of the potentially adhesive material to distribute said material throughout each of the batts; separating one from another the component fibers of each of the batts before removal of the solvent from the batts; and subjecting the separated fibers to a heated gaseous atmosphere to coagulate the potentially adhesive material associated with each of the separated fibers.

References Cited in the file of this patent

UNITED STATES PATENTS

| Number | Name | Date |
|---|---|---|
| 758,243 | Goldman | Apr. 26, 1904 |
| 983,530 | Berger | Feb. 7, 1911 |
| 1,509,359 | Lawson | Sept. 23, 1924 |
| 1,764,631 | Hubinger | June 17, 1930 |
| 1,930,818 | McNamara | Oct. 17, 1933 |
| 1,945,330 | Nord | Jan. 30, 1934 |
| 2,155,653 | Graf | Apr. 25, 1939 |
| 2,280,326 | Kornegg | Apr. 21, 1942 |
| 2,379,264 | Wallach | June 26, 1945 |
| 2,386,713 | Pharo | Oct. 9, 1945 |